(12) United States Patent  (10) Patent No.: US 8,033,065 B2
Paetkau et al.  (45) Date of Patent: Oct. 11, 2011

(54) PREFABRICATED BUILDING PANELS AND STRUCTURES, BUILDING, METHODS AND SYSTEMS RELATING TO SAME

(76) Inventors: Arthur George Paetkau, Winkler (CA); Jake Neufeld, Winkler (CA)

(*) Notice: Subject to any disclaimer, the term of this patent is extended or adjusted under 35 U.S.C. 154(b) by 0 days.

(21) Appl. No.: 12/348,498

(22) Filed: Jan. 5, 2009

(65) Prior Publication Data

US 2010/0095613 A1   Apr. 22, 2010

Related U.S. Application Data

(60) Provisional application No. 61/106,644, filed on Oct. 20, 2008.

(51) Int. Cl.
  *E04C 2/52* (2006.01)
(52) U.S. Cl. ............. 52/220.1; 52/220.2; 52/220.4; 52/302.1
(58) Field of Classification Search ............ 52/169.5, 52/220.1, 220.2, 220.3, 220.4, 220.8, 272, 52/287.1, 290, 302.1, 302.3; 428/167
  See application file for complete search history.

(56) References Cited

U.S. PATENT DOCUMENTS

| | | | | |
|---|---|---|---|---|
| 2,774,574 A * | 12/1956 | Patterson | ................ | 165/55 |
| 2,843,364 A * | 7/1958 | Kahr | ................ | 165/56 |
| 3,265,305 A * | 8/1966 | Johnson | ............. | 237/78 R |
| 4,373,312 A * | 2/1983 | Kim | ................ | 52/309.9 |
| 4,439,966 A * | 4/1984 | Alles | ............... | 52/220.2 |
| 4,571,909 A | 2/1986 | Berghuis et al. | | |
| 4,769,963 A * | 9/1988 | Meyerson | .......... | 52/309.9 |
| 5,310,594 A * | 5/1994 | Holland et al. | ............ | 428/167 |
| 5,740,858 A * | 4/1998 | Ingram | ............. | 165/56 |
| 5,950,389 A * | 9/1999 | Porter | ............ | 52/586.1 |
| 6,408,594 B1 * | 6/2002 | Porter | ............ | 52/794.1 |
| 6,434,890 B1 * | 8/2002 | Konnerth | ............ | 52/79.1 |
| 6,584,740 B2 * | 7/2003 | Record | ............. | 52/270 |
| 6,799,403 B2 | 10/2004 | Winter | | |
| 7,255,152 B2 * | 8/2007 | Friedlich | ............ | 165/53 |

FOREIGN PATENT DOCUMENTS

DE    19611388    11/1996

* cited by examiner

*Primary Examiner* — Brian Glessner
*Assistant Examiner* — Patrick Maestri
(74) *Attorney, Agent, or Firm* — Kyle R. Satterthwaite; Ryan W. Dupuis; Ade & Company, Inc.

(57) ABSTRACT

Wall and floor structures of a building each comprise a base layer comprising prefabricated panels with grooved inner faces and a covering layer disposed over the panels to cooperate with walls of the grooves to define channels extending along the panels. Selected grooves contain in-floor heating elements and electrical wiring and routing components. A prefabricated corner panel is formed by notching out an oversized channel in the same type of panel, bending the panel along the channel and filling a remaining gap at the so-formed corner bend with a higher r-value insulation than the rest of the panel. Wall and floor panels are joined by a connector having a C-shaped portion that caps exterior floor panel edges and an integral projecting portion inserted into a slot formed in the wall panel's insulating layer at a bottom edge of the floor panel.

7 Claims, 12 Drawing Sheets

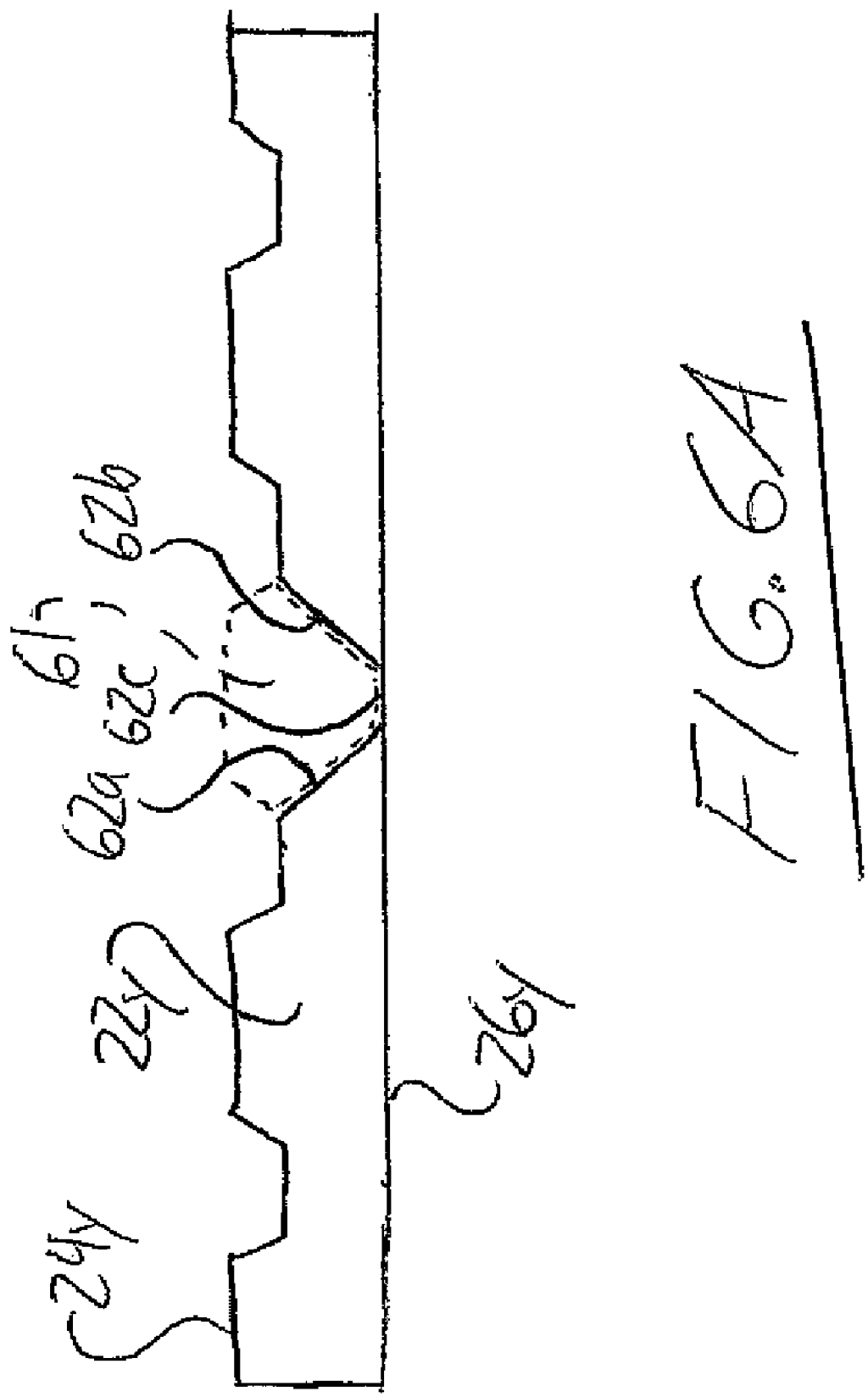

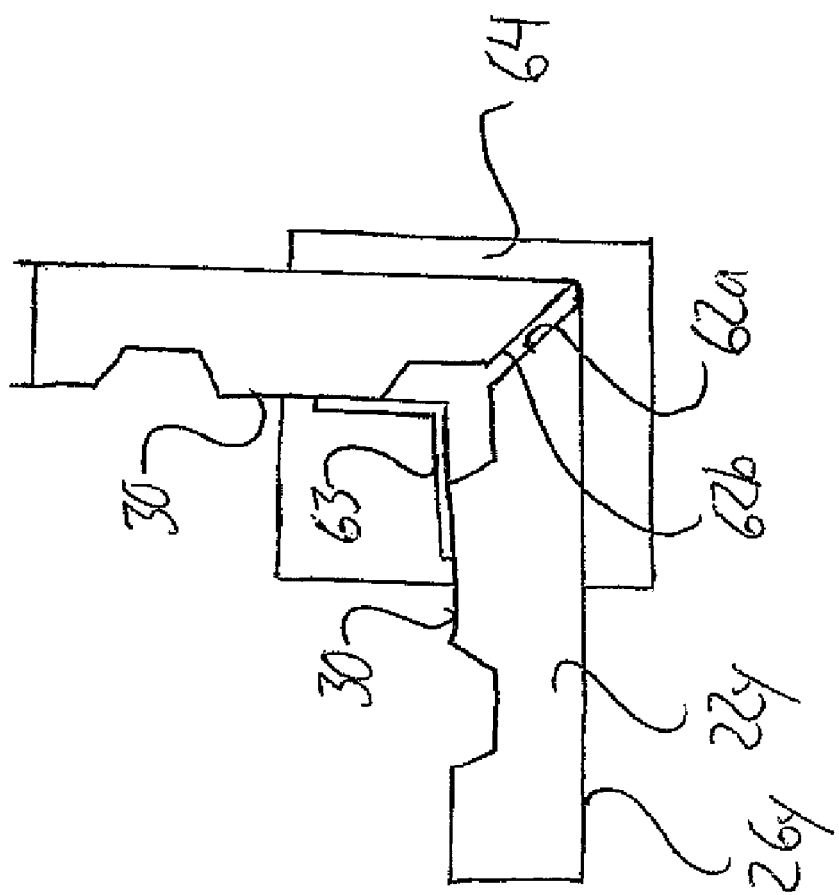

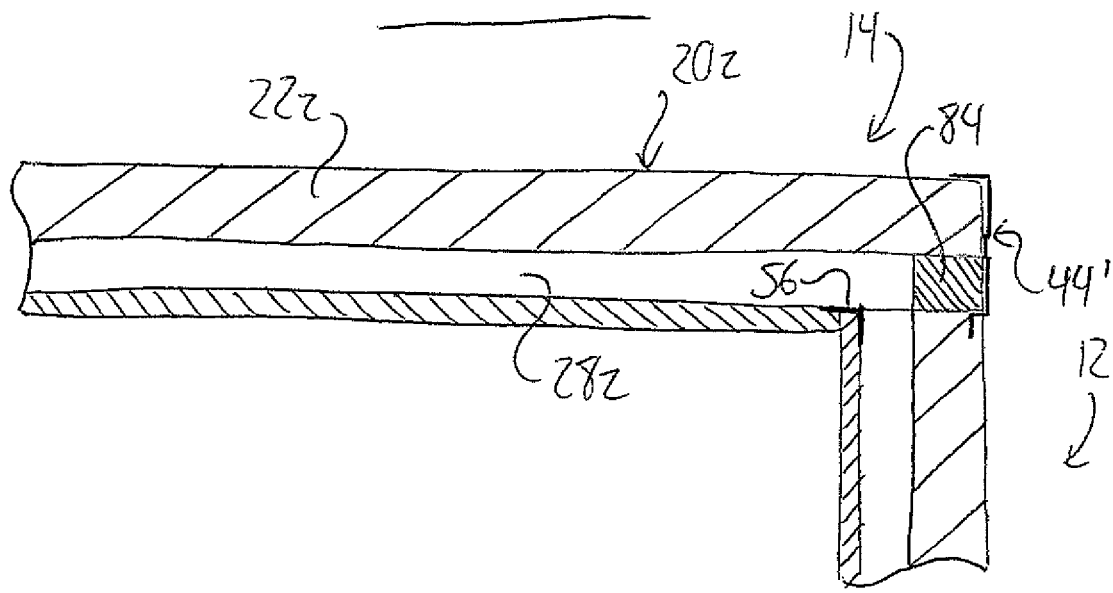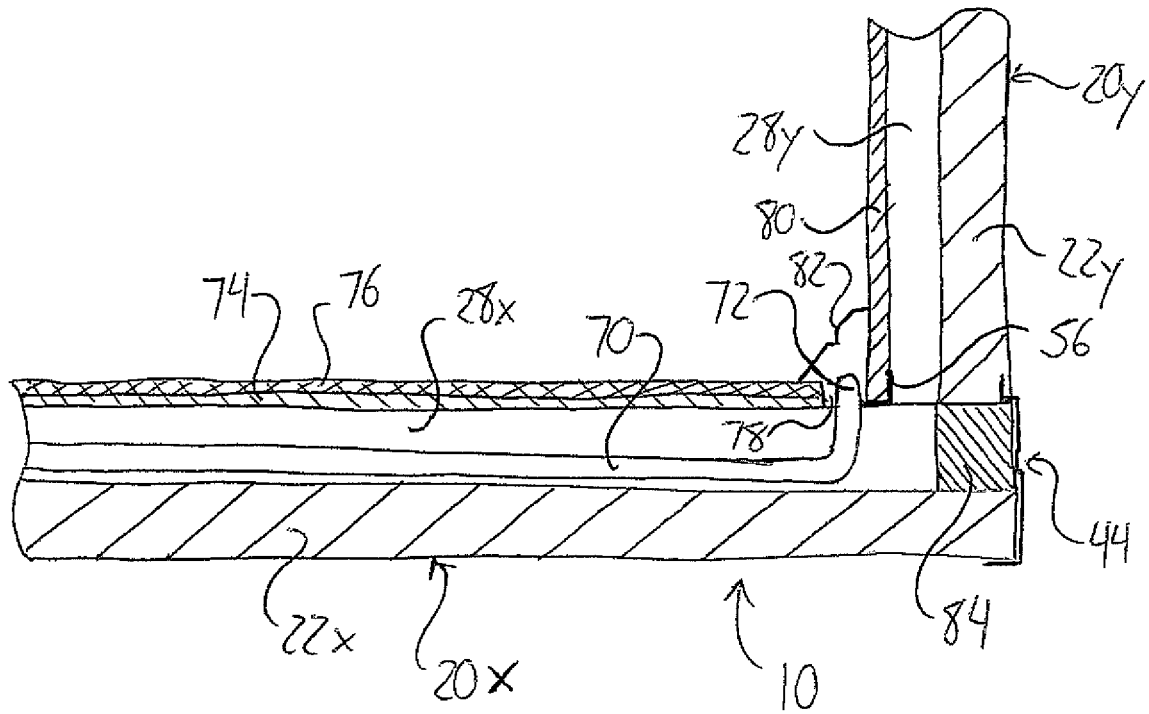
FIG. 8

US 8,033,065 B2

PREFABRICATED BUILDING PANELS AND STRUCTURES, BUILDING, METHODS AND SYSTEMS RELATING TO SAME

This application claims the benefits under 35 U.S.C. 119(e) of U.S. Provisional Application Ser. No. 61/106,644, filed Oct. 20, 2008.

FIELD OF THE INVENTION

This invention relates generally to prefabricated building components, and more particularly to prefabricated building panels, buildings and structures including such panels, methods of producing such panels and associated components and systems for interconnecting such panels.

BACKGROUND OF THE INVENTION

The idea of using prefabricated panels in the construction of homes and other buildings in order to reduce on-site construction times has been known for many years. For example, it is known to use composite structural insulated panels each comprising a sandwiched or layered arrangement featuring a layer of foam insulation material between two metal skins in order to erect load bearing insulating walls by interconnecting such panels edge-to-edge to produce a vertical wall section, without needing to first produce a wall framework to support the insulation-providing panels. However, there is still much room for improvement in this field, for example with regard to reduction of on site completion time, reduction of production costs or improvement in insulation values.

SUMMARY OF THE INVENTION

According to a first aspect of the invention there is provided a heated floor structure for a building, the floor structure comprising:

prefabricated panels interconnected in a parallel edge to edge arrangement to define a floor section, upper faces of the prefabricated panels having grooves formed therein;

a heating element of a radiant heating system disposed in and extending along at least some of the grooves formed in the upper faces of the prefabricated panels; and a cover layer disposed atop the prefabricated panels to cooperate with walls of the grooves to define enclosed channels in which the heating element lies.

Preferably each prefabricated panel comprises a composite panel having an insulation layer disposed between a pair of skin layers, one skin layer of said pair defining the upper face of the prefabricated panel at which the grooves are formed.

Preferably a side of the insulating layer at which said one skin layer is disposed is non-planar, the grooves depending into the insulation layer at said side.

Preferably each skin layer comprises a steel sheet.

Preferably the insulation layer comprises foam insulation.

Preferably the heating element comprises a fluid-carrying conduit.

Preferably the grooves formed in the upper face of the prefabricated panel depend further thereinto than any recess in a lower face of the prefabricated panel opposite the upper face.

Preferably the covering layer comprises planar sheet material overlying the grooves without depending downward thereinto.

Preferably the grooves in each prefabricated panel are parallel to one another.

According to a second aspect of the invention there is provided a building comprising:

a floor structure;

a wall structure erected along a perimeter of the floor structure to depend upward therefrom and surround an interior space of the building; and a roof structure disposed above the wall structure to cover the interior space of the building;

the wall structure and the floor structure each comprising:

a base layer comprising prefabricated panels interconnected in parallel edge to edge arrangements to define floor sections and wall sections respectively, inner faces of the prefabricated panels facing the interior space of the building and having grooves formed therein; and a covering layer disposed over the respective prefabricated panels to cooperate with walls of the grooves to define channels extending along the prefabricated panels at the inner faces thereof.

Preferably a heating element is disposed in at least some of the grooves of the prefabricated panels of the floor structure.

Preferably the heating element extends from one groove in the floor structure to a different groove in the floor structure by having a portion of the heating element pass upward from the one groove at a juncture between the floor structure and a one of the wall sections projecting upward therefrom, extend along said wall structure above the base layer of the floor structure and then pass downward into the different groove.

Preferably there is provided a baseboard member installed at the juncture between the floor structure and the one of the wall sections, the portion of the heating element passing through a passage formed between the baseboard member and the one of the wall sections for concealing of the portion of the heating element.

Preferably the baseboard members each comprise steel.

Preferably the grooves in the prefabricated panels of the floor structure communicate with the grooves in the prefabricated panels of the wall structure to allow airflow therebetween.

Preferably the grooves of the floor structure directly communicate with the grooves of the wall structure where an edge of one of said structures abuts against the inner faces of the prefabricated panels of the other of said structures.

Preferably the grooves in each prefabricated panel are parallel.

Preferably one of the floor and wall structures has ones of the prefabricated panels that have outside edges which face an exterior environment surrounding the building beyond edges of respective prefabricated panels of the other of said structures, the grooves in the one of said structures being closed off to said outside edges.

Preferably ends of the grooves in the ones of the prefabricated panels having the outside edges are plugged with insulating material at positions adjacent said outside edges.

Preferably electrical wiring is routed through selected ones of the grooves to deliver electricity to selected locations within the interior space of the building.

Preferably electrical outlet boxes are mounted within selected grooves in the wall structure, the electrical outlet boxes supporting respective electrical sockets operatively connected to the electrical wiring.

Preferably the wall structure comprises prefabricated bent corner panels each having a bend therein and interconnecting adjacent ones of the wall sections to define a respective corner of the interior space of the building, each corner panel having a composite structure comprising an insulation layer sandwiched between two skin layers, the insulation layer comprising a corner insulation material filling space between the skin layers of the corner panel along the bend therein, the corner insulation material having a higher r-value than a rest of the insulation layer.

Preferably a same type of prefabricated panels as the prefabricated panels used in the wall and floor structures are used in additional edge-to-edge parallel arrangements to define ceiling sections supported over the floor structure by the wall structure.

Preferably the grooves in the prefabricated panels of the ceiling sections communicate with the grooves in the prefabricated panels of the wall structure to allow airflow therebetween.

The roof structure may be installed atop the ceiling sections.

According to a third aspect of the invention there is provided a composite corner building panel for providing pre-formed corners during construction, the panel comprising a layered body having an inner insulation layer disposed between first and second skin layers, the layered body having a bend in the first skin layer to divide the layered body into two portions diverging from one another away from the bend and the inner insulation layer comprising corner insulation material filling space between the skin layers along the bend, the corner insulation material having a higher r-value than a remainder of the insulation layer situated on opposite sides of the corner insulation material outward from the bend along the two diverging portions of the layered body.

According to a fourth aspect of the invention there is provided a method of producing a composite corner building panel for providing pre-formed corners during construction, the method comprising the steps of:

(a) providing a layered body having an insulation layer disposed between first and second outer skin layers;

(b) removing a strip from the layered body along a selected line from a side of the layered body at which the first outer skin thereof is disposed without cutting through the second outer skin so that the removed strip is comprised of removed portions of the first outer skin and the insulation layer, leaving behind remaining portions of the first outer skin and the insulation layer on opposite sides of the line;

(c) forming a bend of a selected angle in the first outer skin of the layered body along the line to divide the layered body into diverging portions extending away from one another while leaving an empty space along the line between the remaining portions of the insulation layer on opposite sides of the bend; and (d) applying an insulating material having a greater revalue than the remaining portions of the insulation layer into the empty space between the remaining portions of the insulation layer.

Preferably step (d) comprises spraying foam insulation into the empty space.

Preferably step (d) comprises covering a side of the empty space opposite the bend and closing off a first end of the empty space at a respective end of the bend, and spraying foam insulation into the empty space from a second end thereof opposite the first end.

Preferably step (d) comprises erecting the panel atop a floor structure to position the bend in the first skin layer in a vertical orientation such that the floor structure closes off the first end of the empty space, positioning an angled member against the panel at the remaining portions of the first skin layer to cover the empty space on the side thereof opposite the bend and spraying the foam insulation into the empty space from above.

According to a fifth aspect of the invention there is provided a method of producing insulating plugs for plugging ends of elongate grooves in building panels to insulate against heat loss at ones of said grooves situated proximate the exterior of a building constructed with said panels, the method comprising the steps of:

(a) spraying foam insulation into one of said elongate grooves in one of said building panels;

(b) allowing the foam insulation to harden; and (c) cutting the foam insulation at selected lengths along said one of the elongate grooves to form a plurality of foam insulation plugs dimensioned to fit said elongate grooves.

Preferably there is provided the step of first covering said one of the elongate grooves with a planar member before spraying and spraying said foam insulation into said one of the elongate grooves from an end thereof.

According to a sixth aspect of the invention there is provided a system for interconnecting two composite building panels at a right angle, the system comprising:

first and second building panels each comprising an insulation layer disposed between a pair of skin layers and having an uncapped edge along which the insulation layer between the skin layers is exposed, the uncapped edge of the first building panel being placeable against a respective side of the second building panel at a position adjacent and parallel to the uncapped edge thereof and the first building panel having a slot depending into the insulation layer of the first building panel along the uncapped edge thereof; and a panel connector comprising a generally C-shaped cross-sectional portion having two parallel legs spaced apart by a central leg spanning therebetween and a projecting cross-sectional portion projecting from one of the parallel legs at an end thereof opposite and to a side thereof opposite the central leg, the C-shaped cross-sectional portion being dimensioned to fit over the uncapped edge of the second building panel to situate the parallel legs on opposite sides of the insulation layer thereof with the projecting cross-sectional portion projecting away from the insulation layer of the second building panel at the respective side thereof for receipt in the slot in the insulation layer of the first panel when the uncapped edge thereof is placed against said respective side along the uncapped edge of the second building panel.

Preferably the slot in the insulation layer of the first building panel is positioned proximate an outer side of the first building panel and the system further comprise a second connector comprising a right angle cross-sectional portion having first and second legs fastenable respectively to an inner side of the first building panel opposite the outer side thereof and to the respective side of the second building panel.

Preferably the panel connector is sufficient in length to substantially cover a full length of the uncapped edge of the second building panel.

Preferably the panel connector has a length of at least twice the full length of the uncapped edge of the second building panel to accommodate at least one additional pair of perpendicular panels in a position adjacent the first and second building panels along the length of the panel connector.

According to a seventh aspect of the invention there is provided a system of mating prefabricated building panels for use in construction of a wall structure and corresponding ceiling or floor structure, the system comprising first and second panels each comprising an insulation layer disposed between a pair of skin layers and each having an uncapped edge along which the insulation layer between the skin layers is exposed, wherein a respective skin of the pair of skin layers of the first panel disposed on a single side of the first panel stops at a distance from the uncapped edge of the first panel so that fitting of the uncapped edge of the second panel against the first panel along the uncapped edge thereof to project the second panel laterally from the first panel fits the insulating layers of the first and second panels against one another along the uncapped end of the first panel.

The first and second panels may be configured such that:
   each is stepped in thickness proximate the uncapped edge of the panel to form a shoulder that projects from a thicker remainder of the panel and defines the uncapped edge thereof;
   the respective skin of the first panel is disposed on a side of the first panel from which the thickness of the first panel is stepped to define the shoulder of the first panel;
   a respective skin of the second panel stops at second distance from the uncapped edge of the second panel and is disposed on a side of the second panel from which the thickness of the second panel is stepped to define the shoulder of the second panel; and
   the shoulders of the first and second panels are dimensioned to fit the uncapped edge of the second panel generally flush against the shoulder of the first panel from the side of the first panel from which the thickness of the first panel is stepped with the remainder of the second panel positioned over the remainder of the first panel so that the second panel projects laterally from the first panel with the insulating layers of the two panels fitted against one another at the shoulder of the first panel.

In the instance of the immediately preceding paragraph, it is preferable that the first panel has grooves formed therein in the side thereof on which the respective skin is disposed, the grooves extending in a direction transverse to the uncapped edge of the first panel and an amount by which the thickness of the first panel is stepped at the shoulder equals or exceeds a depth of the grooves so that ends of the grooves are closed by the shoulder of the second panel when fitted against the shoulder of the first panel.

Preferably the insulation layer of each panel is exposed over a full length of the shoulder on the side of the panel on at which the respective skin layer is disposed.

The respective skin of the first panel may also stop at a distance from a second uncapped edge of the first panel so that fitting of a third panel's uncapped edge against the first panel along the uncapped edge thereof to project the third panel laterally from the first panel fits insulation of the third panel against the insulating layer of the first panel against one another along the uncapped edge of the first panel.

The second uncapped edge of the first panel may be opposite the first uncapped edge thereof, in which case the second panel is preferably stepped in thickness along the second uncapped edge to define a second shoulder for cooperation with the third panel of same structure as the first panel in a likewise manner at an end of the second panel opposite the first panel.

BRIEF DESCRIPTION OF THE DRAWINGS

In the accompanying drawings, which illustrate exemplary embodiments of the present invention:

FIG. 6A is a schematic end view of a building panel having been notched or grooved to form an open channel therein during production of a prefabricated corner panel.

FIG. 6B is a schematic end view of the building panel of FIG. 6A after subsequent bending of the panel and closing of the channel during production of a prefabricated corner panel.

FIG. 8 is a schematic partial cross sectional view of a completed building based on the building construction schematically illustrated in FIG. 1.

DETAILED DESCRIPTION

Figure 1:
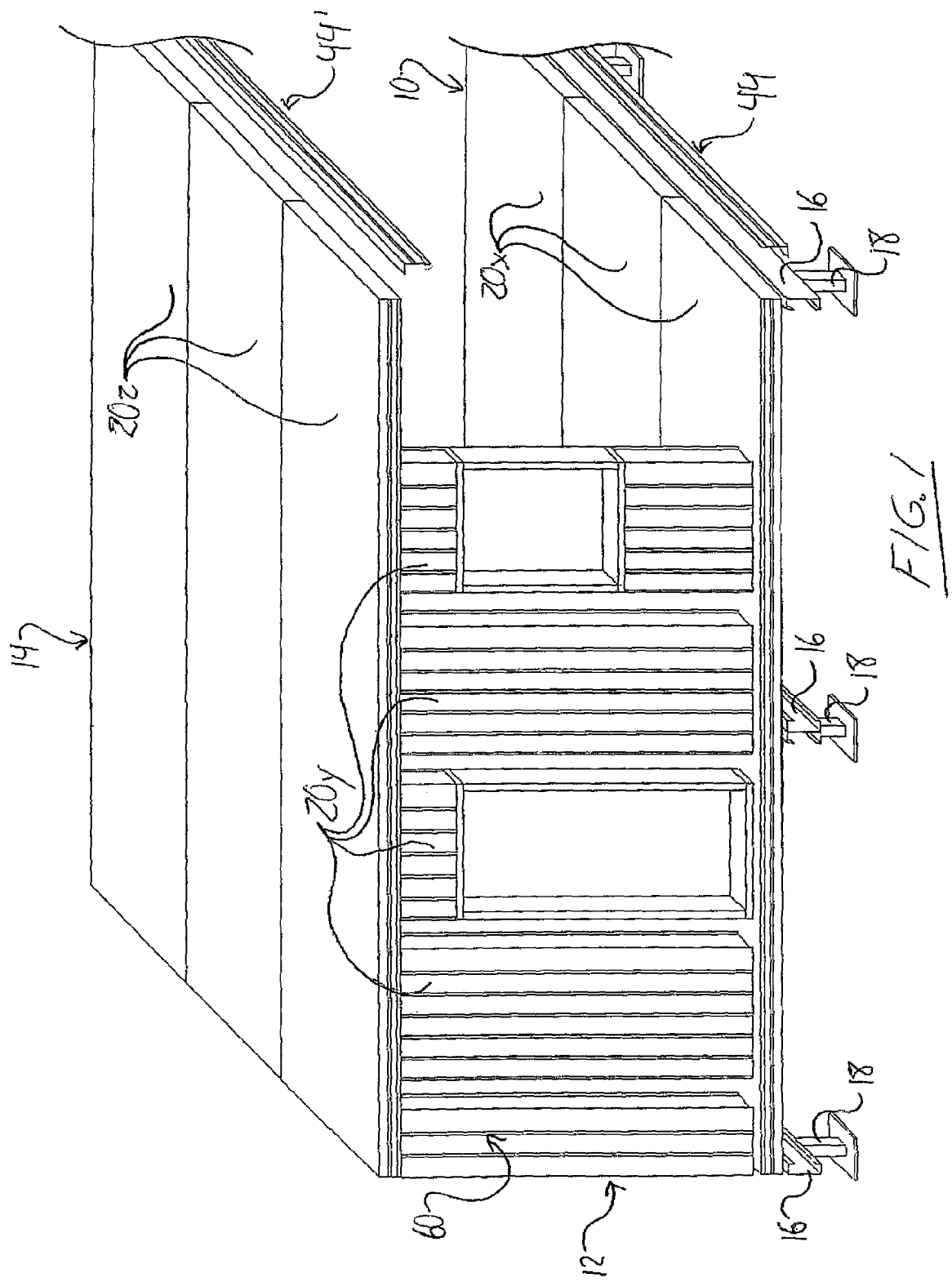
FIG. 1 is a partially exploded schematic perspective view of a building construction using prefabricated building panels in accordance with the present invention.
Figure 2:
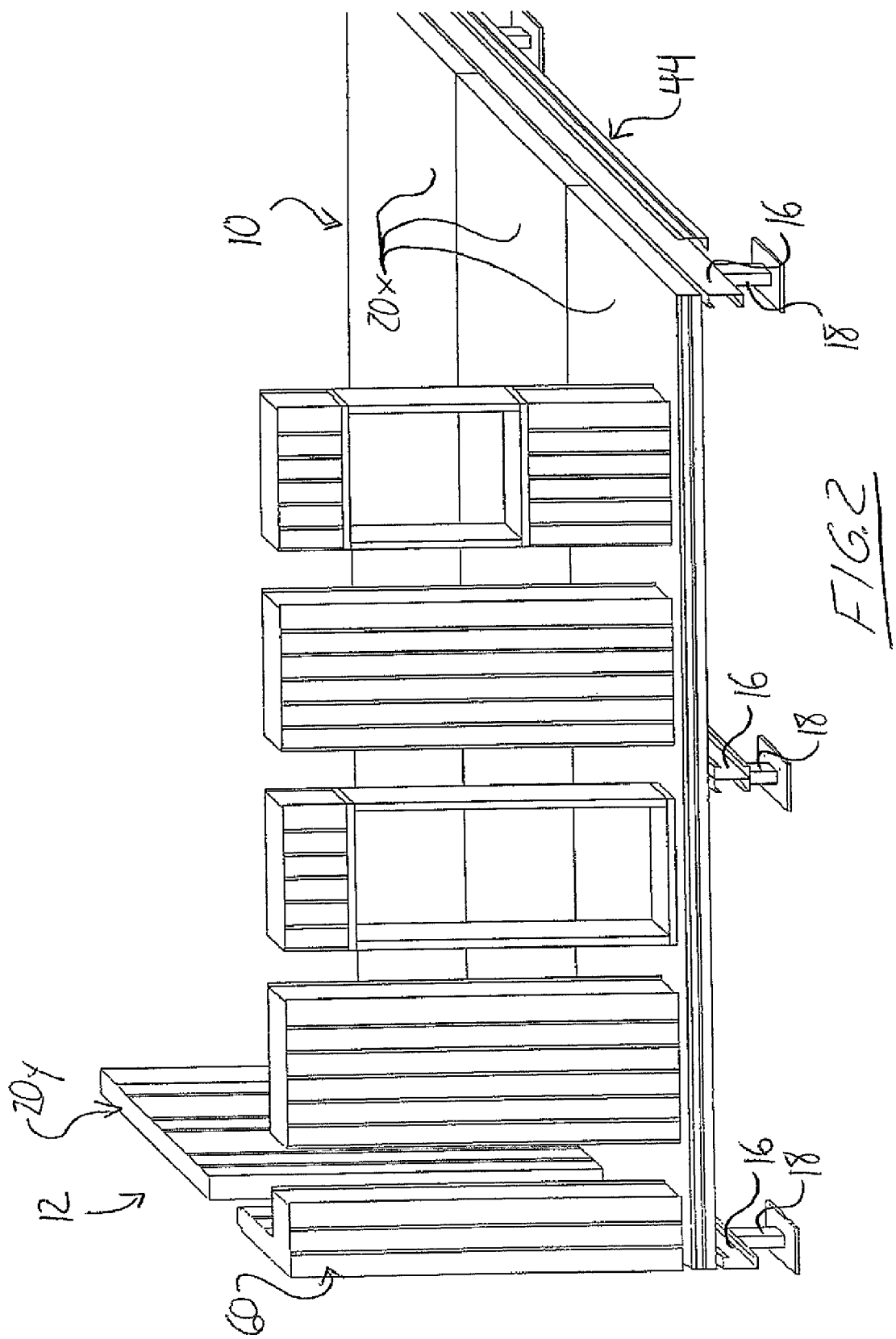
FIG. 2 is another partially exploded schematic perspective view of the building construction of FIG. 1 with ceiling panels thereof removed for illustration.

FIGS. 1 and 2 illustrate the basic construction of a building produced with prefabricated structural insulated panels according to the present invention. The building features a floor structure 10, a wall structure 12 erected atop the floor structure 10 to extend along a perimeter thereof to enclose around an interior space of the building and a ceiling structure 14 disposed atop the wall structure 12 to cover the interior space. In a known manner the, floor structure is supported atop a series of parallel steel channel beams 16, each supported at spaced locations therealong by pier blocks 18 engaged with the ground beneath the building. The floor structure 10, wall structure 12 and ceiling structure 14 are all formed using a same type of prefabricated panels described in detail herein below, the panels of each of these structures being interconnected in parallel edge-to-edge arrangements to define floor, wall and ceiling sections respectively.

Figure 3:
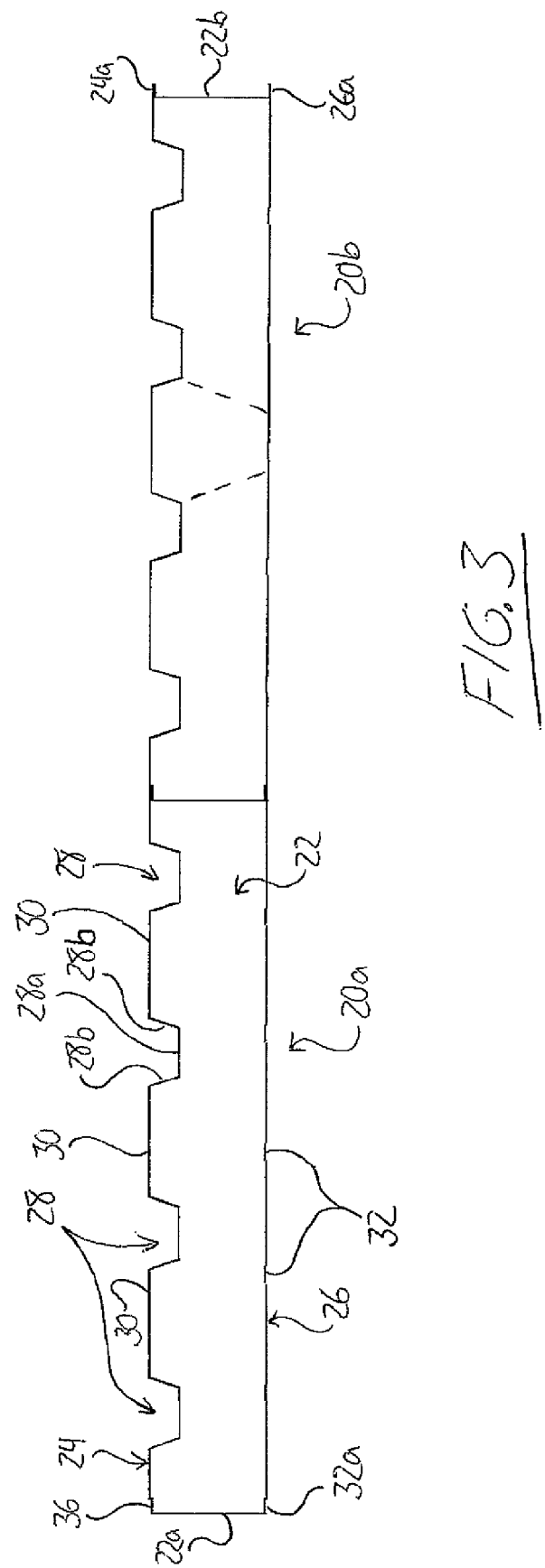
FIG. 3 is a schematic end view of two interconnected prefabricated building panels in accordance with the present invention.

FIG. 3 shows two adjacent prefabricated panels 20a, 20b of equal dimensions interconnected along mating edges thereof defined by the shared length of the elongate panels 20a, 20b. Each panel is of a composite construction featuring a foam insulation layer 22 sandwiched between two metal skin layers defining an inner skin 24 and an outer skin 26 at opposite faces of the panel, intended to face inward toward the building interior and outward toward the surrounding environment respectively during building construction. The inner skin 24 is corrugated to define a parallel a series of parallel grooves 28 evenly spaced apart from one another over the width of the panel, the grooves extending in the lengthwise panel dimension and depending into the insulation layer 22 from the respective side thereof. In the illustrated embodiment, the grooves 28 are equally dimensioned and each of uniform cross section over its length, the cross section being trapezoidal with a flat bottom 28a parallel to the width dimension of the panel and sloped sides 28b diverging outwardly away from the flat bottom 28a at opposite ends thereof toward the interior face of the panel defined by the respective inner skin 24. Between the grooves 28, this inner face of the panel is planar so as to define ridges 30 of trapezoidal cross section inverse to that of the grooves 28 positioned parallel to and between adjacent grooves in the same panel. In the illustrated embodiment, the ridges 30 are of greater width than the grooves 28, or in other words the equal spacing between each pair of adjacent grooves in the same panel along the width dimension thereof is greater than the width of each groove 28 measured in the same direction.

The outer skin 26 of each panel at the side of the insulation layer 22 opposite the inner skin 24 has a ribbed structure, but is much flatter relative to the corrugated inner skin 24. The outer skin 26 has only minor ribs 32 projecting into the insulation layer 22 from an otherwise planar outer face of the panel, these equally dimensioned minor ribs 32 having depth and width significantly less than the grooves 28 depending into the insulation layer 22 at the opposite inner side thereof. The ribs 32 are equally spaced apart from one another along the width dimension of the elongated panel and extend parallel to the grooves 30 at the opposite side thereof. In the illustrated embodiment, each panel has four grooves 28 and six ribs 32.

On each panel, one rib 32a of the ribs 32 in the outer skin 26 of the panel is situated at and extends along a respective one 34a of the panel's two lengthwise edges. A second edge rib 36 of the same dimensions is provided in the same panel at and along the same lengthwise edges thereof, but depending into the insulation layer 22 from the inner skin 24 at the side of the panel opposite the outer skin 26. A respective lengthwise edge 22a of the insulation layer 22 is flush with the ends of the skins 24, 26 defined by and recessed from the respective faces of the panel by these edge ribs 32a, 36. At the opposite lengthwise edge of the panel 34b, each of the inner and outer skins 24, 26 projects outward past the insulation layer 22 along the width dimension of the panel and folds over itself on the insulation side of the skin so as to bend back over itself to the respective lengthwise edge of the insulation 22b layer recessed inward from the lengthwise edge of the panel 34b by this projection of the skins past the insulation layer.

Figure 4:
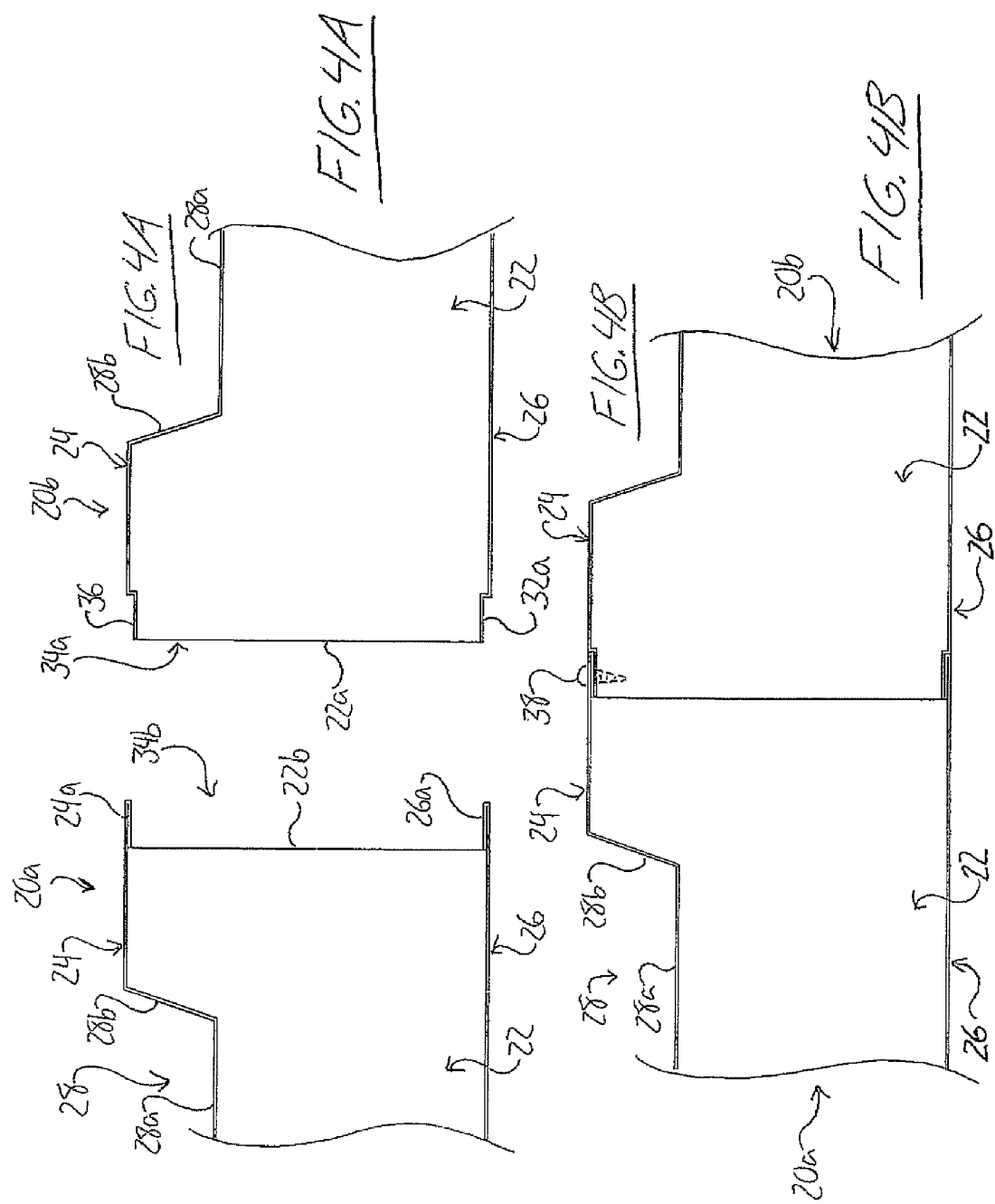
FIG. 4A is a close up schematic partial end view of the panels of FIG. 3 prior to their connection to one another.
FIG. 4B is a close up schematic partial end view of the panels of FIG. 4A subsequent to their connection to one another.

With reference to FIG. 4, these equally dimensioned bent projection portions 24a, 26a of the inner and outer skins 24, 26 of one panel 20a define coupling flanges that cooperate with the edge ribs 32a, 36 of the other panel 20b to facilitate coupling of the adjacent panels together when brought together at their mating lengthwise edges 34a, 34b. The coupling flanges 24a, 26a of panel 20a fit into the recesses provided in the inner and outer faces of the other panel 20b by the edge ribs 36, 32a during the sliding of the panels together along their width dimensions to bring the flat lengthwise edges 22a, 22b of the insulation layers of the two panels 20a, 20b together, as shown in FIG. 4B. A tongue is thus defined by the edge ribs 36, 32a of panel 20b and the portion of the insulating layer thereof between these edge ribs 36, 32a for receipt into a groove defined by the recessing of the insulating layer of panel 20a from the projecting portions or flanges 24a, 26a of panel 20a at edge 22b of panel 20a. As shown in FIG. 4B, with the adjacent panels 20a, 20b so fitted together with their insulating layers abutting one another at the lengthwise edges thereof, fasteners 38 at the flanges 24a, 36a and edge ribs 36, 32a overlapping over the full length of the equally sized panels 20a, 20b can be used to secure the panels 20a, 20b together. So interconnected together, the adjacent panels 20a, 20b, at the portions thereof between the two grooves 28 therein nearest the mated lengthwise edges of the two panels, define a ridge 30a between these two grooves of the same dimensions as the other ridges 30 formed integrally in the individual panels between these two grooves, the flanges 24a, 26a of panel 20a sitting generally flush with the respective skins 24, 26 of panel 20b at the inner and outer faces thereof.

The building of the construction illustrated in FIGS. 1 and 2 is rectangular in plan with the channel beams 16 and the panels of the floor structure extending perpendicular to one another so as to extend in opposite ones of length and width dimensions of the building. The panels of the horizontal floor structure 10 are equally sized and are each of sufficient length to fully span the respective one of these building dimensions, adjacent ones of these panels being interconnected along their mating lengthwise edges as described herein above so that their widths add up to the other building dimension. The resulting floor structure is thus rectangular in shape with parallel grooves equally spaced thereover. At the perimeter of the floor structure 10, panels of the wall structure 12 rest atop the upward facing inner skin of the floor structure panels and project perpendicularly upward therefrom. Although the wall structure panels illustrated in FIGS. 1 and 2 are exploded from one another for illustration, they are fixed together along their vertically oriented mating lengthwise edges as described herein above so that adjacent panels extend widthwise along the respective perimeter edge of the floor structure. In the illustrated embodiment, the equally sized panels of the wall structure 12 are of shorter length than the panels of the floor structure, such that at least one of the two horizontal dimensions of the interior space of the building exceeds the height thereof. The horizontal ceiling structure 14 sits atop the wall structure 12, and consists of an assembly of edge-to-edge interconnected panels like that of the floor structure, having the same number of panels thereas with the panels of the two horizontal structures aligning with one another. Each panel in the floor, wall and ceiling structures is oriented such that its inner skin faces the interior space of the building.

Figure 5:
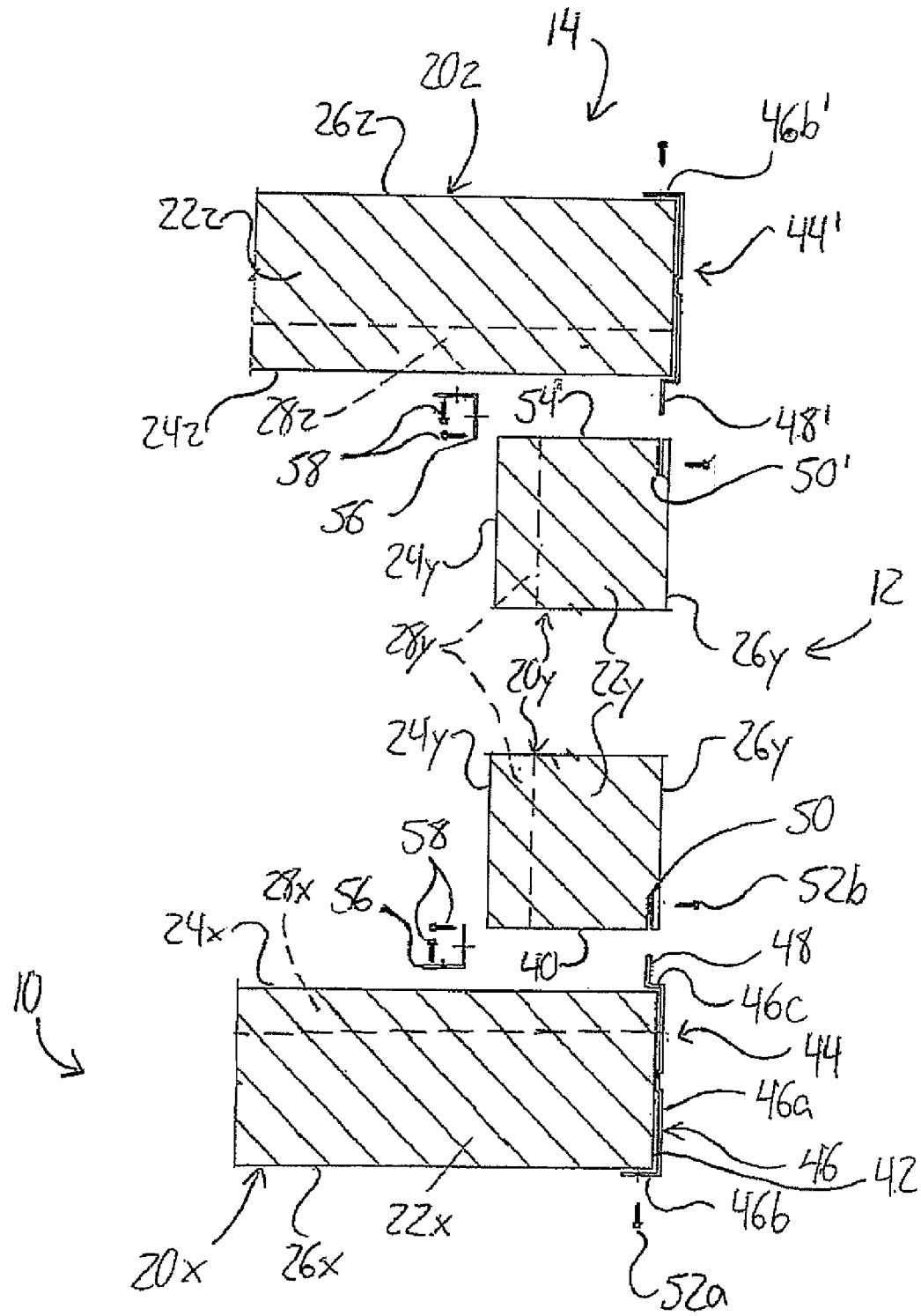
FIG. 5 is a schematic cross sectional view illustrating connection of prefabricated floor, wall and ceiling panels of the building construction of FIG. 1.

FIG. 5 illustrates the connections between the floor, wall and ceiling structures. The figures shows a cross sectional view of a horizontal floor panel 20x, vertical wall panel 20y and horizontal ceiling panel 20z taken along a vertical plane cutting along the lengthwise dimension of the horizontal floor and ceiling panels. The three panels are aligned along their equal widthwise dimensions so that the grooves 28x, 28y, 28z formed at the inner skins 24x, 24y, 24z of the floor, wall and ceiling panels 20x, 20y, 20z respectively align with one another. The cross sectional plane of FIG. 5 is parallel to the grooves, cutting through each panel between adjacent grooves therein. Although the panels are exploded apart in the figure, a bottom widthwise edge 40 of the wall panel 28y is intended to sit flat atop the inner skin 24x of the floor panel 20x and extending along a widthwise edge 42 of the floor panel 28x so as to position the outer skin 26y of the wall panel 20y generally flush with this widthwise edge 42 of the floor panel 20x. This outer skin 26y of the wall panel 20y defines a portion of the building's exterior at the respective wall section on a respective side of the building when completed.

When the floor panel 20x is initially installed atop the pier blocks 18 of FIG. 1, or another suitable foundation, its widthwise edge 42 is initially uncapped or uncovered, in the sense that the insulation layer 22x of the floor panel 20x is exposed to the surrounding environment at this edge 42, as each panel's metal skins only cover its opposite faces, not its peripheral or perimeter edges. To prepare for installation of the wall panel 20y atop the floor panel 20x an elongate channel-like connector 44 is placed over the uncapped widthwise edge 42 to both cover the exposed insulation layer 22x thereat and establish connection between the floor panel 20x and the corresponding wall panel 20y. The elongate dimension of the channel connector 44 extends in the widthwise dimension of the floor panel 20x. In cross section, the channel connector 44 features a first C-shaped portion 46 having a central leg 46a disposed between and interconnecting a pair of spaced apart parallel legs 46b, 46c projecting to one side of the central leg 46a. When the channel connector 44 is installed, the central leg 46a of its C-shaped cross sectional portion spans across the exposed insulation layer 22x at the widthwise edge 42 of the panel to cover this exposed end of the insulation layer and position the parallel legs 46b, 46c exteriorly of the floor panel 20x on opposite sides thereof at the outer skin 26x and inner skin 24x respectively. Each of the parallel legs 46b 46c thus projects inward from the widthwise edge 42 of the floor panel 20x along the lengthwise direction thereof.

At leg 46c situated atop the inner skin 24x of the floor panel 20x, the channel connector's cross section features a projecting portion 48 projecting vertically upward from this horizontal leg 46c of the C-shaped portion at an end of leg 46c opposite the central leg 46a. Over the length of the channel connector 44, the central leg 46a of its cross section defines a cover fitting over the widthwise edge 42 of the floor panel 20x, leg 46b defines a mounting flange fitted against the outer skin 26x at the bottom of the floor panel 20x along the widthwise edge 42 thereof, and the projecting portion 48 defines a supporting flange or tongue for fitting into a corresponding slot 50 cut into the insulation layer 22y of the wall panel 20y at the bottom widthwise edge 40 thereof so as to extend fully through the insulation layer 22y along the wall panel's width at a position adjacent the wall panel's outer skin 26y. With the channel connector 44 installed and the bottom widthwise edge 40 of the wall panel seated atop the inner skin 24x of the floor panel 20x, the projecting portion 48 of the channel connector's cross section thus projects vertically upward into the vertically projecting cross section of the slot 50 extending horizontally along the bottom widthwise edge of the wall panel 20y. The channel connector 44 is fastened to the floor and wall panels 20x, 20y along the flanges defined by leg 46b and projecting portion 48 of its cross section respectively, for example by screws 52a threaded into the floor panel 20x from below through leg 46b of the channel connector's cross section and screws 52b threaded into the wall panel 20y and the projecting portion 48 of the channel connector received therein through the wall panel's outer skin 26y.

With reference to FIGS. 1 and 2, each channel connector 44 is sufficiently long to fully span the respective side of the rectangular building, such that at each of two sides of the building where widthwise edges of the floor panels are situated, a single channel connector 44 connects all wall panels of the respective wall section to all the floor panels. At the other two sides of the rectangular building, where lengthwise edges of the floor panels are instead left uncovered after initial installation of the floor panels on the pier blocks 18, the same type of channel connector 44 is again used to connect all wall panels of the respective wall section on that side of the building, here the channel connector fitting into the wall panels of the respective wall section in the same manner, but extending fully along the lengthwise dimension of a single floor panel rather than covering the widthwise dimensions of several adjacent floor panels. These two sides of the building defined by the lengthwise dimensions of the floor panels will correspond to the ribbed and flanged lengthwise edges 22a, 22b respectively of two floor panels. With reference to FIG. 4A, the flanges 24a, 26a of the one of these floor panels at the perimeter of the building may be cut off before capping of the exterior lengthwise edge of the floor panel with a respective channel connector 44. Similarly, the thinner projecting portion of the other panel defined between the ribs 32a, 36 thereof at its exterior lengthwise edge may be cut off before capping with a respective channel connector 44. As the wall sections defining the respective exterior sides of the building extend along the respective perimeter edge of the floor structure, it will be appreciated that although on these two sides of the rectangular building the channel connectors extend the lengthwise edges of the respective floor panels, the slots in the wall panels still extend in the widthwise dimension thereof.

Referring again to FIG. 5, another channel connector 44' is used at each side of the building to connect the respective wall section to the ceiling structure in the same way. The assembly of channel connector 44' and the ceiling panel 20z is simply inverted from that of channel connector 44 and the floor panel 20x, with leg 46b' sitting atop the ceiling panel 20z on the outer skin 26z thereof, leg 46c' projecting inward from the ceiling panel's widthwise edge to carry the projecting portion 48' depending downward away from the ceiling panel 20z beneath the inner skin 24z thereof. A second slot 50' accordingly depends downward into the insulation layer 22y of the wall panel 20y from a top widthwise edge 54 thereof parallel to the first slot 50 at the bottom widthwise edge 40 and in alignment therewith across the wall panel's thickness. At the junction of the wall section 12 with each of the floor section 10 and the ceiling section 14, an elongate right angle bracket member 56 of metal composition extends along the corner edge of the building's interior space formed at this junction with a respective one of leg of its cross section fastened to the inner skin 24y of the wall panel 20y and the other leg fastened to the inner skin of the respective one of the floor and ceiling panels, for example by screws 58. During installation of the panels a sealant, such as polyurethane foam sealant, is applied between the mating surfaces of the floor and ceiling panel inner skins 24x, 24z and the respective bottom and top widthwise edges 40, 54 of the wall panel 20y to be placed thereagainst.

It will be appreciated that the described channel connectors are not limited to specific use in a building where the ceiling, wall and floor structures all make use of a same type of prefabricated panels. Furthermore, the channel connectors may be used with a panel type completely lacking the illustrated and described grooves 28, or having such grooves on both sides thereof, or used with a panel type having a different panel interconnection arrangement.

With reference to FIG. 2, the wall structure 12 features corner panels 60 having the same length as the other vertically oriented panels of the wall structure, but having a right-angle L-shaped cross section. The corner panel is produced by notching out a strip or groove from one of the generally planar wall panels 20y from the interior side thereof and then bending the left-intact outer skin 26y through ninety degrees to take on the right-angle configuration. The use of such corner panels in the building construction to interconnect non-parallel wall sections disposed on opposite sides of an exterior corner of the building avoids the need to seal and cover gaps that would otherwise be left between adjacent non-parallel wall panels at the intersection of two wall sections.

Figure 6C:
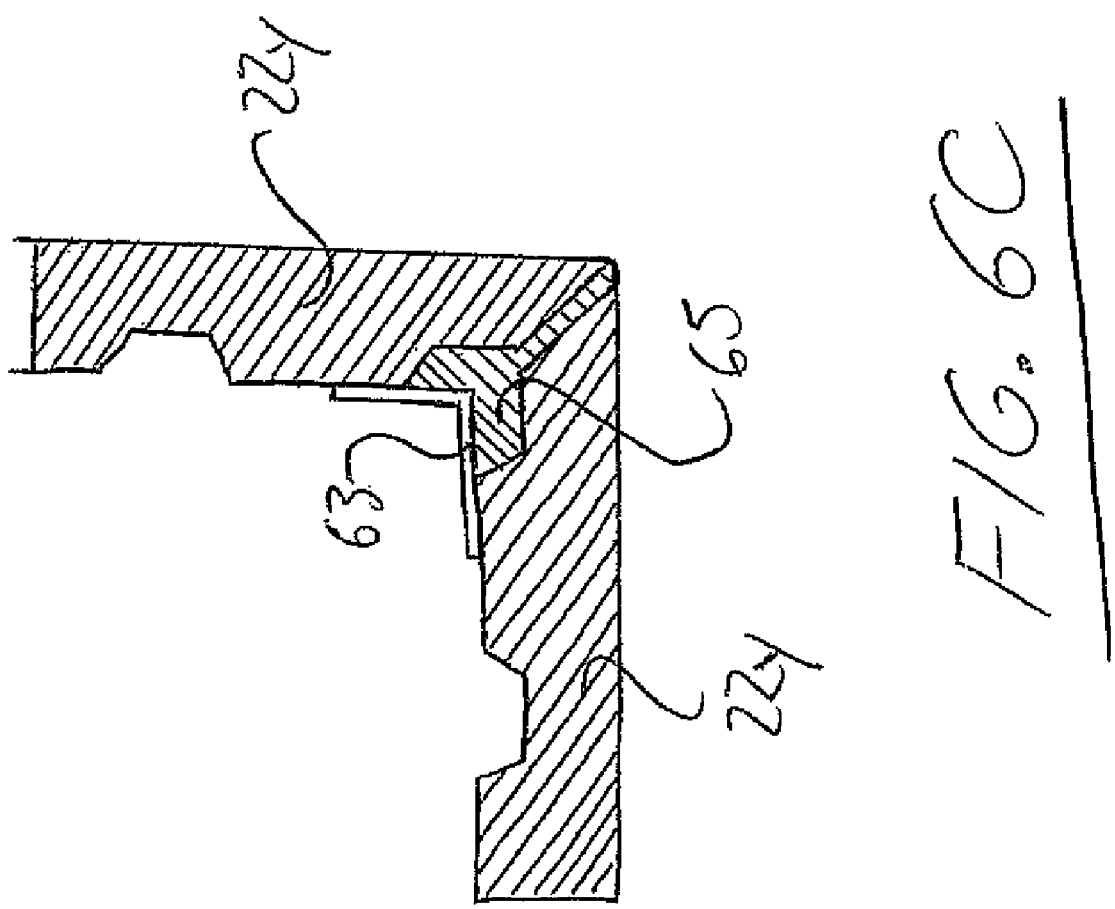
FIG. 6C is a schematic cross sectional view of the building panel of FIG. 6B after subsequent filling of the channel with an insulation material of higher revalue than a remainder of the panel's original insulation layer to complete the corner panel.
Figure 7:
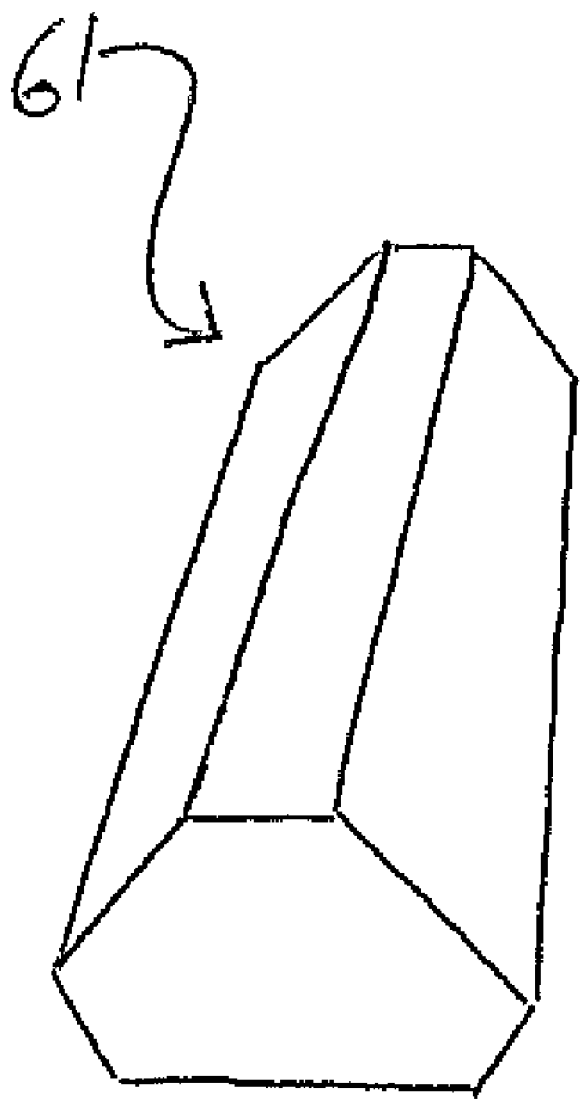
FIG. 7 is a perspective view of a strip or section removed from the building panel of FIGS. 6A during the formation of the open channel.

With reference to FIGS. 6A to 6C, which illustrate stages in the production of the corner panel 60 from a wall panel 20y, first a strip of the sandwiched together inner skin 24y and insulation layer 22y of a wall panel 20y of the type described above is cut away, scraped or otherwise removed from the side of the panel at which the inner skin 24y is located. This removal of material is performed along an imaginary center line extending the full length of the panel at a widthwise central position along the outer skin 26y, without cutting through the outer skin 26y so as to thereby leave the outer layer of the panel fully intact. FIG. 6A shows the panel at this stage, with the removed strip outlined in broken lines and generally indicated at 61. The removal of the strip produces a corresponding empty open channel extending along the panel's center line at a position between two fully remaining portions of the insulating layer 22y left on the two halves of the outer skin 26y divided by the panel's central line therealong. The channel's cross section has two sloped sides 62a, 62b formed by the two fully remaining portions of insulating layer 22y, these sides extending obliquely from the intact outer skin 26y in a diverging manner away therefrom on opposite sides of the panel's center line, each at forty-five degrees to the intact outer skin 26y. These sloped sides 62a, 62b do not meet, but instead are spaced apart where they project from the intact outer skin 26y, leaving an exposed portion of the outer skin's inner surface exposed to define a bottom of the channel 62c. The sloped sides 62a, 62b of the channel intersect with adjacent one's of the panel's existing grooves 28 on opposite sides of the panel's center line where the bottoms 28a of these grooves previously met the sides of these grooves nearest the panel's center line. Three sides of the removed strip's cross section are defined by the ridge that previously existed between the two adjacent central grooves symmetrically disposed on opposite sides of the panel's center line, the other three sides of the strip corresponding to the sides and bottom of the newly formed channel.

The channel formed in the panel thus has a cross-sectional shape and size that exceeds that which is required to facilitate bending of the panel along the central line thereon into the right-angle L-shape of the desired corner panel 60, so that when the outer skin 26y is so bent to divide the panel into two portions diverging away from one another at ninety degrees on opposite side of the central line, a gap extending the full length of the panel remains between the two remaining portions of the original insulating layer 22y, specifically between the now parallel and together-facing channel sides 62a, 62b.

Referring to FIG. 6B, with the outer skin so-bent to give the panel its final exterior shape, an elongate angle bracket member 63 of right angle cross section is fixed at the resulting interior corner of the panel, opposite the exterior corner defined by the bend in the outer skin 26y, by fastening the two legs of the right angle cross section of the bracket 63 to the two respective remaining portions of the inner skin 24y on a respective one of the now diverging portions of the panel so as to close the space left between these diverging panel portions inward from the outer skin 26y. In the illustrated embodiment where the channel formed in the panel communicates with a central pair of the previously existing grooves 28, this space closed off by the bracket 63 includes the aforementioned gap between the two remaining portions of the original insulating layer 22y and the central pair of grooves 28 now communicating therewith, each leg of the bracket being fixed to a respective ridge 30 of the panel between a respective one of the now communicating pair of central grooves and an adjacent groove nearest the respective lengthwise edge of the panel.

Still referring to FIG. 6B, with this elongate space now closed along the interior side of the panel by the bracket member 63 so as to define a closed channel, one end of this channel is then also closed off, for example by a plate 64 having a surface area greater than the space's cross sectional area held over this channel end. From the other left-open end of this channel, foam insulation material of a greater r-value than the original insulating layer 22y is then sprayed into this closed channel, filling the empty space between the remaining portions of the original insulation layer and the now-communicating central pair of grooves open thereto. This produces the corner panel shown in FIG. 6C, having insulating material 65 of a greater r-value along the corner or bend therein than elsewhere along the diverging portions of the L-shaped panel. Having the better sealed corner due to the intact outer skin integrally connecting the resulting outer wall surfaces and the improved corner insulation due to the greater r-value insulation is significant, as corners in some prior art constructions are where problems can start with cold air meeting warm air, causing moisture and then mold.

In the illustrated embodiment, the completed corner panel 60 features half the number of empty grooves 28 on the interior side thereof compared to the planar panel from which it is produced, one groove 28 in each of the two diverging portions or halves of the corner panel. At opposite ends of its L-shaped cross section, the completed corner panel 60 features the same two lengthwise edges as the original planar panel, such that the corner panel can be installed between two end ones of the planar panels of two adjacent wall sections through cooperation with the corresponding mating lengthwise edges of these end ones of the planar panels of the two walls sections to be connected by the corner panel. It will be appreciated that corner panels having cross sections of angles other than ninety degrees may similarly be produced through the strip removal, bending and insulation adding process described herein above, by modifying the bend angle while ensuring that the cross sectional shape and size of the removed strip is sufficient to leave the gap or space between the remaining portions of the original insulation layer after bending. The described corner panels are also not limited to specific use in wall structures or in a building where the ceiling, wall and floor structures all make use of a same type of prefabricated panels. Furthermore, the corner panel may be produced from a planar panel completely lacking the illustrated and described grooves 28, or having such grooves on both sides thereof, from a panel type having a different panel interconnection arrangement, or even from a non-structural panel type lacking the strength-enhancing ribs in the bendable outer skin.

FIG. 8 shows a cross sectional view similar to that of FIG. 5, but after the floor, wall and ceiling sections 10, 12, 14 have been interconnected with one another on the building site and with the cross sectional plane extending in the same direction but cutting through the aligned grooves 28x, 28y, 28z of the floor, wall and ceiling panels 20x, 20y, 20z, rather than cutting through the panels between two sets of such aligned grooves. A radiant in-floor or under-floor heating system is provided for heating the building, such systems being well-known and thus not described herein in great detail. In the illustrated embodiment, the heating system is fluid-based, with each heating element of the system thus defined by a length of tubing laid beneath the floor covering over an area of the interior space of the building for pumping of heated water through the hose such that heat radiates upward from the water-circulating hose through the floor covering to heat the interior space. From the following description, it should be apparent that an electric in floor heating system may alternatively be applied in a similar manner, in which case each heating element is instead formed by an electric cable.

During installation of the heating system, the tubing 70 is laid within at least some of the grooves 28x in the array of parallel grooves defined in the floor structure by the arrangement of floor panels 20x laid parallel in an edge-to-edge manner interconnected along their lengthwise edges as described herein above. Lengths of the tubing are laid in a back and forth manner, extending in one direction along a first groove and then turning back along itself in another groove. As shown in FIG. 8, the transfer of the tubing 70 from one groove to another is accomplished by a portion 72 of the tubing that projects upward from out of the respective groove 28x in the floor panel 20x and extends along the widthwise dimension of the panel 20x overtop the upward facing inner skin 24x thereof so as to pass over one or more of the ridges (see 30 in FIG. 3) in the corrugated inner skin 24x before depending back downward into another groove in the same panel or another panel of the floor structure and changing direction to extend along this second groove in a direction opposite that which it extends in the first groove. Once the tubing 70 is laid out in this manner to cover the region of the floor structure and interior space it is intended to heat, a covering layer 74 of plywood or other suitable sheet material is laid over the tubing-equipped floor panels 20x and fastened thereto at the ridges defining the upper face of the floor panels between the grooves 28x therein at the inner skin 24x. A layer of flooring material 76, such as carpet, tile, vinyl, hardwood or laminate, is then installed atop the covering layer 74.

A gap 78 is left between the covering layer 74 and the wall panel 20y, which is fitted with an interior wall finishing layer 80, which may be any of a several different types known to those of skill in the art, at the wall panel's inner skin 24y by fastening thereto at the ridges. The gap left between the now otherwise substantially covered floor and wall panels therein accommodates the portion 72 of the heating system tubing 70 passing over the floor panel 20x along this juncture between the wall section and floor structure. An elongate baseboard member 82 lies along the horizontal corner of the building's interior space defined by this juncture of the respective wall and floor sections, providing a section spanning from one end atop the flooring layer 76 to an opposite end situated against the wall finishing layer 80, extending upward and over the portion 70 of the heating system tubing 70 spanning between grooves in the floor structure. The baseboard member 82 so positioned is fastened to one or both of the covered wall or floor structures and cooperates with the covered floor and wall panels 20x, 20y to define an enclosed channel through which the heating system tubing 70 extends where it changes directions from one pass thereof to another.

Due to the alignment of the floor panel grooves with corresponding wall panel grooves, the floor panel groove 28x along which the heat system tubing 70 extends is open to the respective wall panel groove 28y where the wall panel 20y sits atop the floor panel 20x. This fluid communication between these grooves provided by their direct opening into one another allows warmed air heated by the tubing 70 in the floor panel groove 28x to rise upward along the wall section within the wall panel groove 28y. In the same manner, the respective ceiling panel groove 28z communicates directly with the wall panel groove 28y at an end thereof opposite the floor panel groove 28x. This allows heat to not only be distributed into the interior space of the building through the floor structure covering and flooring layers, but also to be distributed along the exterior walls and ceiling. At the wall section opposite that shown in FIG. 8, the floor panel groove 28x and ceiling panel groove 28z each communicate with the respective wall panel groove in this other wall section. The floor and ceiling grooves 28x, 28z are closed off from the outside environment surrounding the building by the channel connectors 44, 44' installed at the otherwise uncovered widthwise edges of the floor and ceiling panels 20x, 20z. These channel connectors are preferably made of rolled metal sections, and so insulating plugs 84 fill end portions of the floor and ceiling panel grooves 28x, 28z at positions directly below and above the portion of the wall panel insulating layer 22y aligned with these grooves to better close off these grooves to, and insulate them from, the outside environment. The insulation plugs 84 are installed in the floor and ceiling panels 20x, 20z prior to connection thereof with the wall panel 20y to allow application of sealant between the insulation plugs 84 and the wall panel insulation layer 22y during construction of the building.

To produce insulationasE plugs 84 of the correct cross section to fit against the surfaces of the grooves to be plugged thereby, a process similar to that used to inject higher r-value insulation into the corner panel 60 during production thereof is applied. A planar prefabricated panel of the same type to have its groove ends plugged has a flat plate fastened to its inner skin so as to fully cover the open side of the groove's cross section over the full length of the groove. One end of the groove is similarly covered to seal off the groove except the opposite end still remains open. Having applied mold release to the groove, spray foam insulation is sprayed thereinto from the open end thereof, filling the groove with the insulation material. The sprayed insulation is allowed to harden, thereby forming an elongate strip of insulation having the same uniform cross sectional shape as the groove. The covering plate is removed from the panel and the strip of insulation is cut into several lengths, each suitable for selected use as an insulating plug for filling in a portion of a groove having the same dimension used in forming the plug.

As is known, the interior space of the building may of course be divided by the erecting of interior walls between the floor and ceiling structures 10, 14, in which case routing of the heating system tubing between grooves of the floor structure at an interior wall crossing these grooves may similarly be achieved in a concealed manner by another channel-defining installation of a baseboard member covering up transitions of the tubing from groove to groove. In such a multi-room building, different rooms may have different tubing conduits laid out therein in the manner described herein above. The enclosed channels defined by the grooves in the panels and respective floor covering or wall or ceiling finishing layers fitted thereover and the other enclosed channels defined by cooperation of the baseboard members with the wall and floor sections may also be used to accommodate electrical wiring to facilitate routing thereof to various locations throughout the building, for example from a breaker box to junction boxes, socket-carrying outlet boxes or light-fixture boxes mounted within selected panel grooves behind the respective covering or finishing layer, or to one more hard-wired appliances. Similarly, the panel grooves may provide passages for routing of pipes, tubing or conduits for one or more plumbing fixtures within the building. Baseboard junction members having a pair of branches diverging away from one another a short distance along respective wall sections of a corner-defining wall junction may be fastened in place at or just above floor level at such a corner, a distal end of each branch defining a channel that receives an end of a respective baseboard so that two baseboards extending toward the corner have their ends hidden from sight between the junction member and the walls to prevent a need to make miter cuts for fitting of the baseboard ends together. Such baseboard junction members may each be an integral unit of molded plastic.

Figure 9:
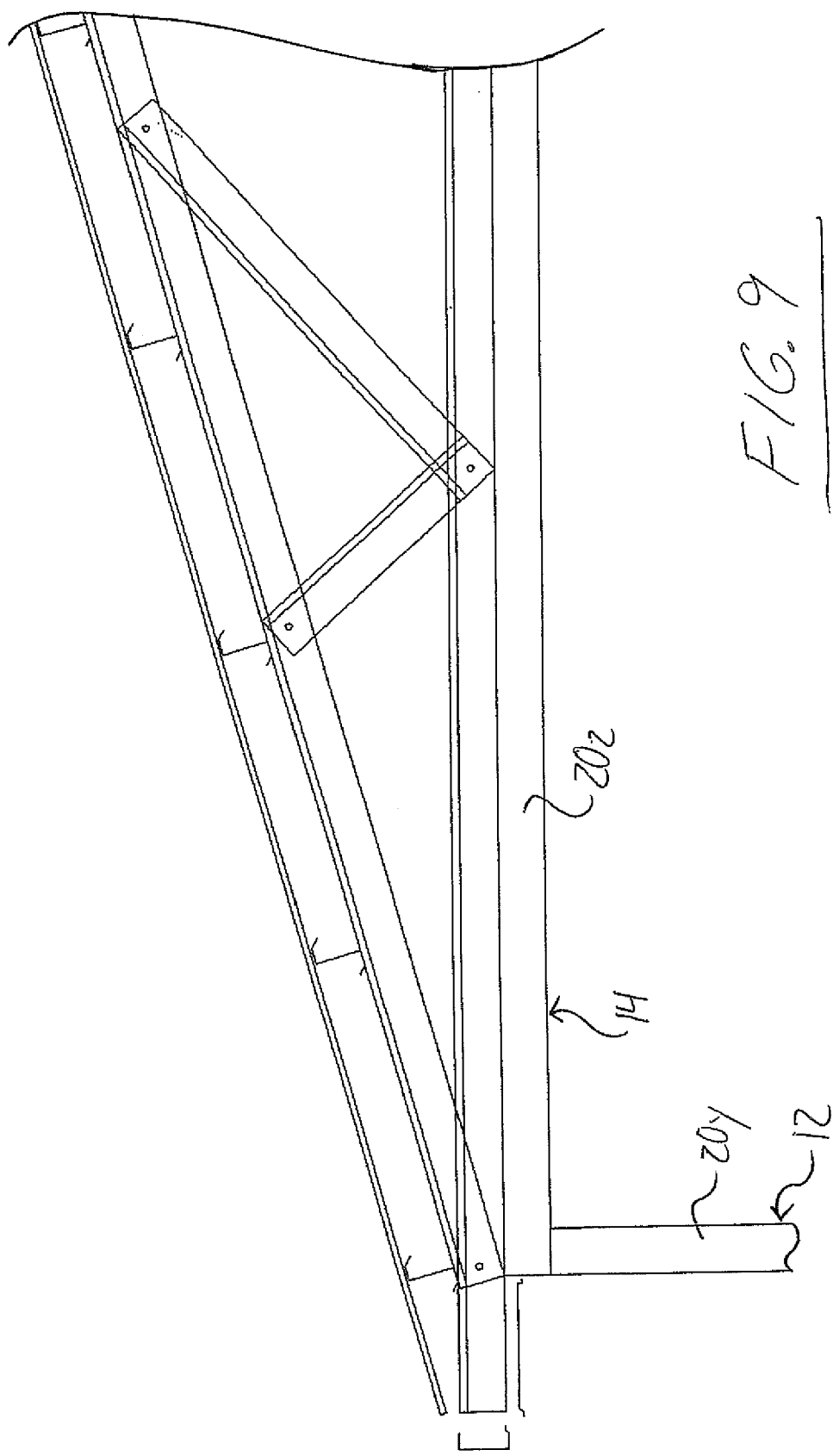
FIG. 9 is a schematic illustration of a roof structure installed atop a ceiling structure of the building construction of FIGS. 1 and 2 during completion thereof.

As shown in FIGS. 1 and 2, selected ones of the wall panels 20y may be cut to remove a selected portion thereof for replacement of this section by a window or door frame. The prefabricated panels described herein preferably feature steel skins and a polyicynene insulation layer for relatively high strength, insulation and fire resistance values. Used with channel connectors, right-angle brackets and baseboards of steel or other metal composition, the use of wood in the building can be kept to a minimum. FIG. 9 shows how a roof structure may be installed atop the wall and ceiling structures using truss assemblies having overall lengths exceeding the respective dimension of the ceiling structure along which they extend so as to create a suitable overhang. The use of steel or other metal trusses and roof paneling contribute to the minimal use of wood in completion of the building. As an alternative to installation of a separate roof structure atop the horizontal ceiling structure described herein above, it may be possible to construct a suitable roof and ceiling structure using the same prefabricated panel type as the wall and floor structures. In other words, installation of such panels in a non-horizontal sloped configuration atop the wall structures could define both the ceiling of the building's interior space and the exterior roof. Installation of a series of roof sections, each comprising an edge-to-edge parallel arrangement of panels, that are sloped relative to one another could produce a peaked roof.

Figure 10:
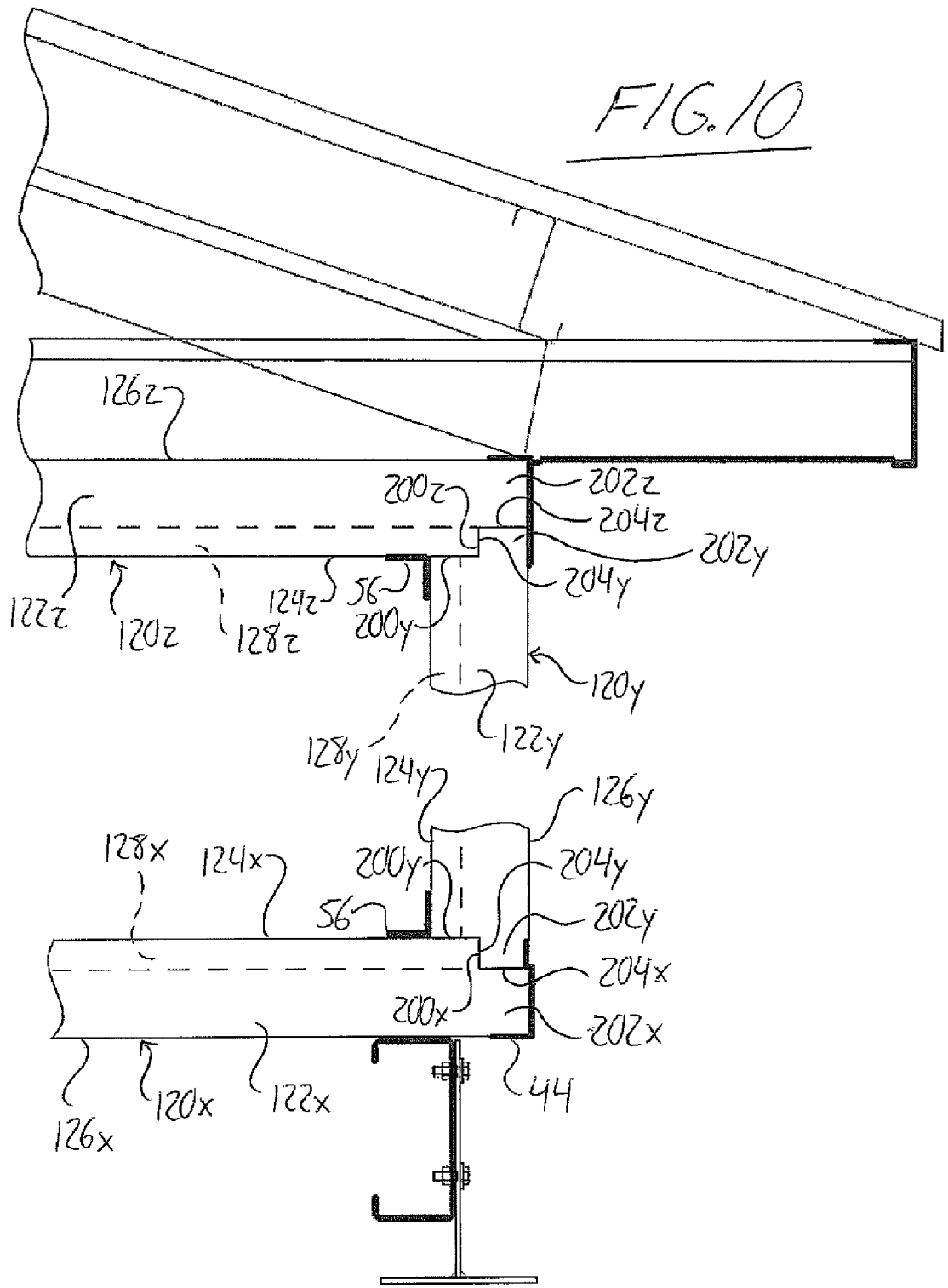
FIG. 10 is a partial schematic side view of an alternate embodiment building construction featuring a mating arrangement at the interconnection of the wall panels with the floor and ceiling panels to reduce heat transfer between the building interior and exterior.

FIG. 10 shows an alternate embodiment building having the same overall structure of that of FIGS. 1, 2 and 9 with the exception of modifications made at the interconnection of the ceiling and floor panels with the wall panels to reduce or minimize heat transfer between the building interior and the surrounding exterior environment. As illustrated in FIG. 5, and described with reference thereto herein above, the first embodiment building construction has the wall panels 20*y* thereof sitting directly atop the inner skin 24*x* of the floor panels 20*x* with the ceiling panels 20*z* in turn sitting atop the wall panels 20*y*. In the first embodiment building, the insulation layer 22*y* of each wall panel 20*y* thus fits against the interior skins 24*x*, 24*z* of the respective floor and ceiling panels 20*x*, 20*z* since these panels are assembled in their original unmodified form in which the two skins of each panel both cover the full surface area of the panel, each skin spanning fully between opposite widthwise edges and between opposite lengthwise edges of the panel. These edges of each panel may be described as uncapped in the sense that, prior to assembly with other panels to form the ceiling, wall and floor structures and prior to installation of the channel-like connectors or other covers over the edges at the resulting exterior of the building, the insulation layer between the skins of the panel is uncovered and exposed as these edges. With reference to FIG. 5, this spanning of the interior skins 24*x*, 24*z* of the floor and ceiling panels 20*x*, 20*z* over the full length and width of these panels means that these skins extend fully to the exterior of the resulting building where the channel-like connectors 44, 44' are installed. As a result, these metal skin layers 24*x*, 24*z* provide a highly heat conductive pathway between the building interior and exterior, leading to an undesirable amount of heat transfer across the building envelope. The second embodiment building shown in FIG. 10 is configured to eliminate this highly heat conductive pathway to reduce heat transfer between the building interior and exterior.

FIG. 10 shows a schematic side view of the building taken from a vertical plane parallel to the grooves 128*x*, 128*y*, 128*z* formed in the interior sides of the floor, wall and ceiling panels 120*x*, 120*y*, 120*z* respectively. Along an uncapped external widthwise edge of each panel perpendicular to the grooves therein, a strip of rectangular cross section has been cut out of the panel at the intersecting corner of the original inner skin and this external widthwise edge along the full length of this edge (i.e. the full width of the panel). The perpendicular sides of each cut-away rectangular strip are parallel to the coplanar sections of the inner skin and the external widthwise edge of the panel respectively, giving each of the resulting modified panels 120*x*, 120*y*, 120*z* a stepped configuration in which its thickness steps down at a single right angle step 200*x*, 200*y*, 200*z* at a short distance perpendicularly inward from the external widthwise edge. This step 200*x*, 200*y*, 200*z* defines leaves a shoulder portion 202*x*, 202*y*, 202*z* at the end of the panel 120*x*, 120*y*, 120*z* that is of a lesser thickness than the remainder of the panel and projects outward from the remainder of the panel to define the remaining intact portion of the original external widthwise edge.

In cutting away the rectangular strip at the edge of the panel, portions of both the interior skin 124*x*, 124*y*, 124*z* and insulating layer 122*x*, 122*y*, 122*z* of the panel are removed, meaning that the resulting shoulder 202*x*, 202*y*, 202*z* features only the outer skin layer 126*x*, 126*y*, 126*z* on the exterior side of the panel 120*x*, 120*y*, 120*z*. That is, the ledge-defining face or surface 204*x*, 204*y*, 204*z* of the shoulder 202*x*, 202*y*, 202*z* on the interior side thereof has no skin layer defined thereon, instead being formed by an uncovered exposed flat surface of the insulating layer 122*x*, 122*y*, 122*z* of the panel 120*x*, 120*y*, 120*z*. The inner skin 124*x*, 124*y*, 124*z* thus no longer spans the full length of the panel from one crosswise or widthwise edge thereof to the other, instead stopping inwardly short of the exterior widthwise edge of the panel at the thickness reducing step 200*x*, 200*y*, 200*z* formed by the removal of the widthwise edge strip of the panel.

With the wall, floor and ceiling panels 120*x*, 120*y*, 120*z* modified as described above to produce the shoulders 202*x*, 202*y*, 202*z*, the panels are then assembled as follows. The wall panel 120*y* is disposed atop the floor panel 120*x* to fit the bottom of its two widthwise edges, now defined by the bottom one of the wall panel's two shoulders 202*y*, against the upward facing ledge-defining surface 204*x* of the floor panel's shoulder 202*x*. As the foam insulating layer 122*y* of the wall panel 120*y* is exposed at the bottom uncapped edge thereof and the ledge surface 204*x* of the floor panel's shoulder 202*x* is defined by the floor panel's foam insulating layer 122*x*, the engagement of the wall panel 120*y* and floor panel 120*x* is now foam-on-foam. Compared to the first embodiment building, the inner skin 124*x* of the floor panel 120*x* no longer extends to the building exterior, instead stopping inward therefrom part way across the thickness of the wall panel 120*y*. There is now no metal pathway for highly conductive heat transfer between the building interior and exterior, as any heat transfer path through the panels from inside the building to the outer skin of the building, as defined by the outer skins of the panels and the caps or channel-like connectors of the completed building structure, is at least partially formed by the insulating material within the panels.

The shoulders 202*x*, 202*y*, 202*z* of the panels 200*x*, 200*y*, 200*z* are cooperatively dimensioned so that the thickness of the wall panel shoulder 202*y* is generally equal to the length by which the floor panel shoulder 202*x* projects from the remainder of the floor panel so that the remaining intact portion of the wall panel's bottom widthwise edge fully occupies the ledge surface 204*x* of the floor panel shoulder 202*x* without extending outwardly past the floor panel's respective widthwise edge. This, together with the rectangular flat-sided shaping of the stepped ends of the panels, ensures that mating of the floor panel and wall panel together to fit the wall panel's bottom widthwise edge against the ledge face 204*x* of the floor panel shoulder 202*x* and fit the step 200*y* of the wall panel's bottom end against the flat portions (see 30 in FIG. 3) of the floor panel's inner skin 124*x* defining the inwardmost extent of the floor panel 120*x* between the grooves therein orients the wall panel 120*y* in a position projecting perpendicularly to the floor panel 120*x* to project laterally upward therefrom with the outer skin 126*y* of the wall panel 120*y* generally flush or coplanar with the external widthwise edge of the floor panel 120*x*.

The depth of the step 200*x* in the floor panel 120*x* defining the reduction in the floor panel thickness toward the widthwise external edge, and the generally matching length of the projection of the wall panel shoulder $202y$ from the thicker central portion of the wall panel $120y$ remaining between its stepped ends, is equal to or greater than the depth of the grooves $128x$ in the floor panel $120x$. This way, with the floor and wall panels $120x$, $120y$ mated together as described above, not only is heat conduction through the inner skin $124x$ of the floor panel $120x$ prevented from directly reaching the exterior of the building, but the ledge surface $204y$ of the wall panel shoulder $202y$ engages against the step surfaces $200x$ of the floor panel defined between the grooves $128x$ thereof so that the wall panel shoulder $202y$ blocks or closes off the ends of the floor panel grooves $128x$. This eliminates the need to use the insulating plugs 84 of the first embodiment building (see FIG. 8) to close off end portions of the floor panel grooves $128x$ to prevent communication thereof with the exterior environment.

The upper one of the two stepped ends of the wall panel $120y$ cooperates with the stepped external widthwise end of the ceiling panel $120z$ in the same manner as the bottom stepped end of the wall panel cooperates with the external stepped end of the floor panel 120 to position the wall and ceiling panels in a perpendicular configuration, to provide insulation-to-insulation contact between the panels to prevent the inner skin $124z$ of the ceiling panel $120z$ from reaching the exterior of the building and to close off the grooves $128z$ of the ceiling panel $120z$.

It will be appreciated that the description of a rectangular strip with respect to the stepped panel end configurations of FIG. 10 is used to denote the shape of the resulting empty space or void adjacent the shoulder ledge of the modified panel on the inward facing side thereof nearest the remaining inner skin, or in other words to describe the shape along two perpendicular sides of which continuous cuts over the full width of the panel may be made to form the step and resulting shoulder. Due to the presence of the grooves extending the full length of the panels in a perpendicularly transverse direction to the widthwise edges of the rectangular panels, the actual material removed from the end of the panel to form the shoulder would not be a strip of continuous uniform rectangular cross section.

Preferably, the thickness reducing step and the shoulder are square so that the length by which the shoulder perpendicularly projects from the end of the thicker remainder of the original panel and the reduced thickness of the panel at the shoulder are each equal to one half of the original overall panel thickness. This way, the same process can be used to form the stepped end of each panel that is to be notched or cut to form the stepped configuration at one or both ends while ensuring that the ends of any two such panels will fit together as described above. For example, panels of the type described herein above have been produced with four grooves equally spaced apart and centered over a panel width of 36 inches measured perpendicularly between the lengthwise panel edges (not including the flanges $24a$ of FIGS. 3 and 4), an overall panel thickness of 5 inches, a groove depth of 1.5 inches, an overall groove width of 3.5 inches measured that the open end or mouth of the groove, planar sections of the inner skin measuring 5.5 inches across from the mouth of one groove to the next, minor or strengthening ribs of 0.125-inch depth and 0.75-inch width spaced 6 inches apart center to center over the panel width and a corresponding coupling flange width of 0.75 inches. Such panels are preferably cut to produce shoulders of 2.5 inches in thickness and 2.5 inches in projecting length.

As shown in FIG. 10, the channel-like connector 44 of the first embodiment building may be used in the same manner to fasten the floor and ceiling panels together and cover the previously uncapped external widthwise edge of the floor panel, the connector differing only in that the its central portion is shorter as it spans across only the thickness of the floor panel shoulder $202_x$, not the full overall thickness of the floor panel. One leg of the connector is again situated against the outer skin $126x$ of the floor panel $120x$, while the other is now situated against the insulation-defined ledge surface $204x$ of the floor panel shoulder $202x$ instead of the inner skin of the panel. The projecting portion of the connector projects from the distal end of the leg disposed on the inner side of the floor panel $120x$ at the shoulder $202x$ and is received in the slot in the bottom widthwise edge of the wall panel $120y$ at the distal end of the wall panel shoulder $202y$. Again, the same connector may be used in an inverted orientation to connect the wall panel $120y$ to the ceiling panel $120z$, or alternatively, as shown in FIG. 10, a right-angle channel member may be fastened to the outer skins $126y$, $126z$ of the wall and ceiling panels to join them together and cover the exterior widthwise edge of the ceiling member. As in the first embodiment, right angle channel or bracket members 56 are used to fasten the wall panel to the respective floor and ceiling panels at the interior corners defined therebetween.

It will be appreciated that along an exterior lengthwise edge of the described panel type having only lengthwise grooves therein, the above described stepped configuration would not be needed where since there are no grooves having open ends at this edge of the panel. Instead, rather than cutting away a strip of combined inner skin and insulating layer portions along the exterior edge of the panel, removal of a strip-like portion of only the inner skin would be sufficient to provide insulation-on-insulation engagement of panels to be perpendicularly mated along this lengthwise edge of the panel. For example, with reference to the floor panel $120x$ of FIG. 10, a lengthwise edge of this panel perpendicular to the stepped widthwise edge thereof at the exterior of the building could have a strip-like portion of the inner skin $124x$ at this lengthwise edge cut and removed so that the inner skin $124x$ no longer spans the full width of the panel, but rather stops at a distance perpendicularly inward from the lengthwise edge of the panel. The wall panel to be installed along this lengthwise edge of the panel would sit atop the floor panel at this edge to situate the outer skin of the wall panel flush or coplanar with the lengthwise edge of the floor panel, with the exposed insulation layer of the wall panel at the bottom widthwise edge thereof thus sitting face-to-face atop the portion of the floor panel's insulation layer exposed at the inner side of the floor panel by the strip of the inner skin layer removed at the lengthwise edge of the floor panel over the full length thereof. Like at the stepped ends, this stopping of the interior skin of the floor panel inward from the edge avoids having the metal skin provide a highly heat conductive passage to the exterior of the building between the floor panel and respective wall panel. As the wall panels installed in this manner along the floor panel's lengthwise exterior edge only have to span from the inner skin $124x$ of the floor panel $120x$ to the inner skin $124z$ of the ceiling panel $120z$, and not the additional height added by the steps $200x$, $200z$ at the exterior widthwise ends of the floor and ceiling panels $12x$, $120z$, these exterior wall panels for installation along the lengthwise exterior side of respective floor panels would be cut to an overall length shorter than the overall length of the end wall panels at the widthwise exterior edges of the floor panels and equal to the thicker central portion of the end wall panels left intact between the stepped ends thereof.

An exterior wall right angle corner panel of the type described herein above may be similarly configured for use with the stepped or notch ended rectangular floor panel of FIG. 10. A one of the corner panel's two diverging portions intended for mounting at the stepped ends of the floor panel 120*x* and respective ceiling panel 120*z* would have its ends likewise notched or stepped over the full width of the outer skin of this one diverging portion, while the other of the two diverging portions would not have its ends notched or stepped, but rather cut down across the full thickness of this second portion from the distal end thereof up to the cut line forming the step of the first of the two diverging portions of the corner panel.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A building comprising:
a floor structure;
a wall structure erected along a perimeter of the floor structure to depend upward therefrom and surround an interior space of the building; and
a roof structure disposed above and supported by the wall structure to cover the interior space of the building;
the wall structure and the floor structure each comprising prefabricated panels interconnected in parallel edge to edge arrangements to define floor sections and wall sections respectively;
each prefabricated panel comprising a layered body having an insulation layer sandwiched between inner and outer skin layers, the insulation layer comprising an insulation material distinct from a load bearing material of each skin layer and being of greater thickness than each of the skin layers;
wherein each wall structure is seated atop the floor structure and is connected thereto by a channel-shaped connector having a cross-section that comprises a first portion embracing about an exterior edge of the floor structure facing an outside environment surrounding the building at a respective exterior side thereof to define top and bottom legs of said cross-section that project inward from said exterior edge respectively over and beneath one or more prefabricated panels of the floor structure, and an upwardly projecting second portion extending upward from the top leg of the first portion into a slot formed in the insulation layer of the prefabricated panels of the wall structure where said prefabricated panels of the wall structure are seated atop the floor structure.

2. The building of claim 1 wherein the connector is fastened to the floor structure by screws threaded thereinto through the bottom leg of the first portion of the connector and through the outer skin layer of the one or more prefabricated panels of the floor structure.

3. The building of claim 1 wherein the connector is fastened to the wall structure by screws threaded thereinto through the projecting portion of the connector and through the outer skin layer of the prefabricated panels of the wall structure.

4. The building of claim 2 wherein the connector is fastened to the wall structure by screws threaded thereinto through the projecting portion of the connector and through the outer skin layer of the prefabricated panels of the wall structure.

5. The building of claim 1 wherein each connector is a rolled metal section.

6. The building of claim 1 wherein the slot in the insulation layer of the prefabricated panels of the wall structure is positioned adjacent the outer skin layer thereof.

7. The building of claim 1 wherein the inner skin layer of each prefabricated panel of the floor structure is corrugated to define parallel grooves therein at an inner face thereof by extending into the insulation layer toward the outer skin layer from ridges of the inner skin layer left at the inner face of the panel between the grooves, and wherein prefabricated plugs each pre-configured to have a same cross-sectional shape as said grooves are disposed within ones of the grooves that meet the exterior edges of the floor structure at positions beneath respective ones of the wall sections to seal off and insulate said grooves from the outside environment.

* * * * *